United States Patent [19]

Panchetti

[11] 4,357,026
[45] Nov. 2, 1982

[54] RADIAL GASKET WITH PROTRUDING LIP PORTION

[75] Inventor: Benito Panchetti, Turin, Italy

[73] Assignee: POLIMAC S.A.S. di Pelissero-Panchetti & C., Italy

[21] Appl. No.: 197,628

[22] Filed: Oct. 16, 1980

[30] Foreign Application Priority Data

Sep. 25, 1979 [IT] Italy ................ 25963 A/79

[51] Int. Cl.³ .................................... F16J 15/32
[52] U.S. Cl. .................................. 277/153; 277/65; 277/84
[58] Field of Search ............... 277/81 R, 84, 92, 95, 277/152, 153, 65, 35–39

[56] References Cited

U.S. PATENT DOCUMENTS

| 2,542,234 | 2/1951 | Chambers | 277/47 |
| 2,881,015 | 4/1959 | Wahl | 277/1 X |
| 3,022,081 | 2/1962 | Kosatka | 277/84 X |
| 3,086,781 | 4/1963 | Hudson et al. | 277/84 X |
| 3,438,639 | 4/1969 | Paulsen | 277/84 |
| 3,746,351 | 7/1973 | Tucker | 277/153 |
| 4,208,057 | 6/1980 | Messenger | 277/37 |

FOREIGN PATENT DOCUMENTS 2455649 5/1976 Fed. Rep. of Germany .

*Primary Examiner*—Robert S. Ward, Jr.
*Attorney, Agent, or Firm*—Lerner, David, Littenberg & Samuel

[57] ABSTRACT

Radial gaskets for use in connection with shafts which are axially movable within a cylinder containing a pressurized fluid, particularly in connection with McPherson type dampers. The gaskets include a rigid support ring and a shaped body of flexible sealing material having a lip on the surface of the shaft which when submitted to fluid pressure forms a cutting angle substantially equal to 90° when the gasket is in its working condition. In this manner, the scraping effect of the gasket is increased and the possibility of fluid blow-out and the resultant stresses due to fluid pressures are avoided without negatively affecting the positioning of the lip with respect to the relevant articulation line of the gasket.

7 Claims, 5 Drawing Figures

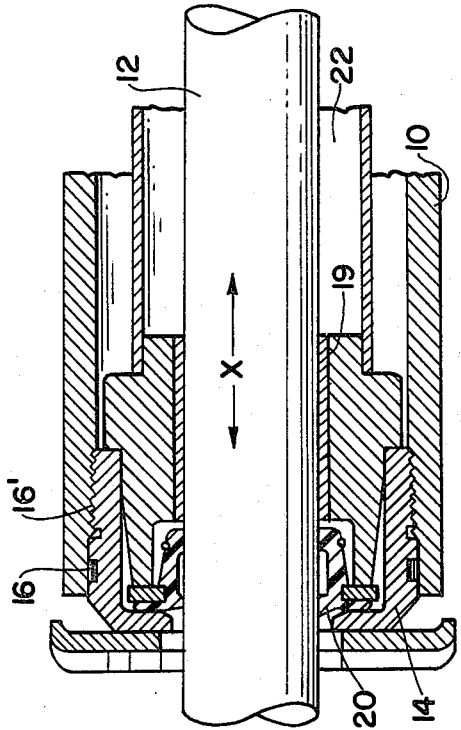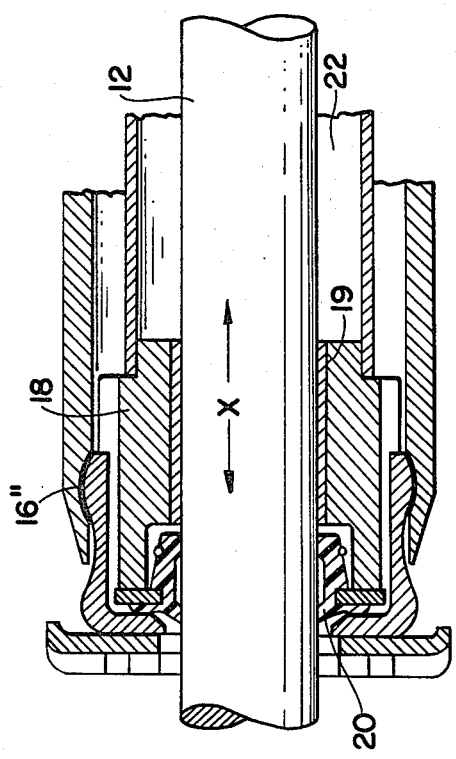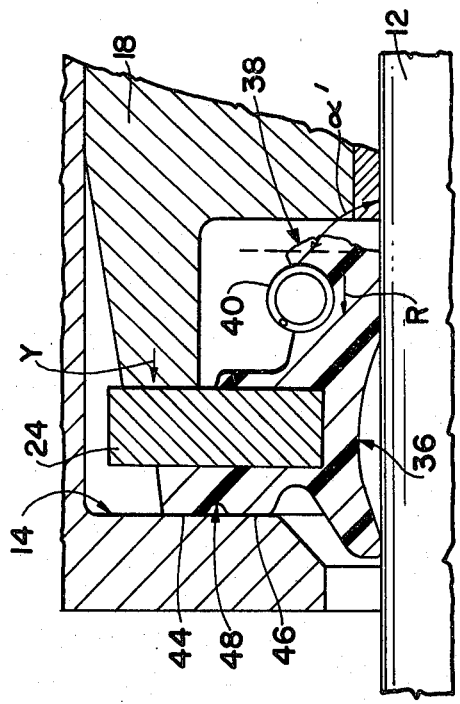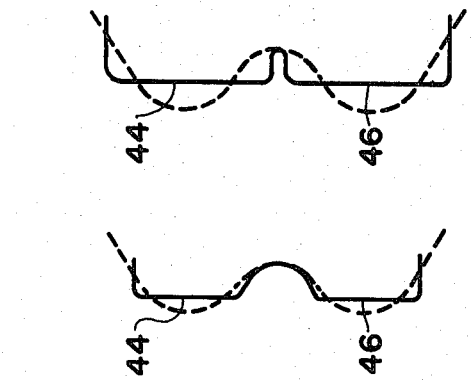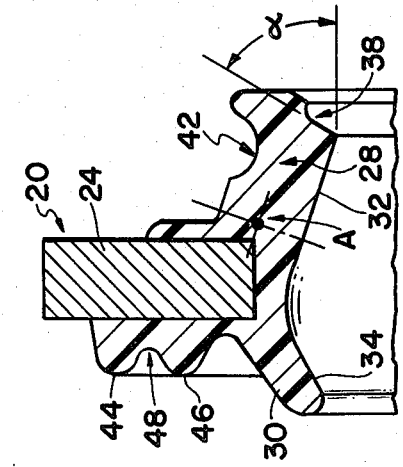

RADIAL GASKET WITH PROTRUDING LIP PORTION

FIELD OF THE INVENTION

The present invention relates to radial gaskets for use in connection with shafts capable of axially moving through cylinders containing a pressurized fluid, particularly in dampers of the McPherson type. More particularly, the present invention relates to such gaskets including a stiff support ring and a shaped body made of a flexible sealing material mounted on the ring, and including a dynamic sealing circular lip on a front closing surface of the cylinder, perpendicular to the shaft axis.

BACKGROUND OF THE INVENTION

Radial gaskets of the aforesaid type are well known, and in use they generally comprise, besides the mentioned features, another dynamic sealing lip acting on the shaft surface at the end opposite to the one where pressure is exerted. The main sealing lip is also usually maintained in sealing position against the shaft surface by means of a suitable spring, such a helicoidal spring annularly positioned on the outside of same, and capable of developing a radial action towards the axis of the shaft.

Gaskets of this type, as manufactured and used up to now, generally present a main lip which has an externally limiting surface which is designed to be submitted to the fluid pressure, and which forms with the gasket axis a predetermined angle. That angle is obviously going to increase in value after the mounting of the gasket on the shaft, and the subsequent rotation of the lip around the relevant articulation lines. In any case, in the known configurations this angle, called the cutting angle, always shows a value substantially lower than 60°, so that when the gasket is in its working position this surface essentially has the shape of a truncated cone with an apex on the shaft axis inside the sealing ring of the gasket.

These known gaskets have not, however, provided entirely satisfactory results, particularly in connection with those uses previously described, primarily due to the blow-by of the damper liquid which occurs, particularly after the prolonged use of same.

It is therefore an object of this invention to provide a radial gasket of the aforementioned type and for the stated uses, which now permits the strict avoidance of any fluid blow-by in connection with its dynamic sealing aspects. It is another object of this invention to provide a gasket of this type which also allows for improved static sealing in connection with the closing surface of the cylinder, especially in dampers, such as those of the McPherson type.

BRIEF SUMMARY OF THE INVENTION

In accordance with the present invention, these and other objects have now been accomplished by providing a radial gasket for use in connection with such shafts which are adapted for axial movement within the cylinder containing a fluid under pressure and having a front face substantially perpendicular to the shaft and through which the shaft projects, the gasket being adapted to be mounted in a working configuration at the intersection of the shaft with the front face of the cylinder, and comprising a rigid, annular support ring and a shaped body of flexible sealing material carried by the rigid support ring, the shaped body of flexible sealing material having a gasket axis parallel to the axis of the shaft and including a first surface for dynamic contact with the shaft and a second surface for static contact with the front face of the cylinder, the first surface of the shaped body of flexible sealing material including a protruding lip portion extending in a direction generally away from the front face of the cylinder so as to be subjected to said fluid under pressure with the cylinder, and including an end face, the shaped body of flexible sealing material having a normal configuration prior to being mounted in its working configuration such that the angle between the end face of the projecting lip portion and the gasket axis is less than 90° and whereby upon being mounted in its working configuration the protruding lip portion of the first surface of the shaped body of flexible sealing material is caused to rotate about its articulation line so that the angle between the end face of the cylinder and the gasket axis becomes substantially equal to 90°. In accordance with a preferred embodiment, the angle between the end face of the protruding lip portion and the gasket axis when the gasket is in its normal configuration prior to being mounted in its working configuration is greater than about 60°.

In accordance with another embodiment of the gasket of the present invention, the first surface includes a second protruding lip portion extending in a direction towards the front face of the cylinder. Preferably, that second protruding lip portion projects at an angle with respect to the gasket axis so as to project towards the shaft, whereby when the gasket is in its working configuration both of the protruding lip portions are in contact with the shaft with a hollow space being formed therebetween.

In accordance with another embodiment of the gasket of the present invention, the rigid annular support ring is mechanically stressed in a direction parallel to the shaft axis and towards the front face of the cylinder, and the second surface includes a pair of circular concentric sealing lips forming a hollow space therebetween. Preferably, at least one of these sealing lips on the second surface is in substantial alignment with the area of the rigid annular support ring which is submitted to mechanical stress.

As compared to the previously known techniques in this field, the objects of the present invention are achieved by using such a gasket in which the surface forming the external limit of the main (first) lip is designed to be subjected to fluid pressure. This lip forms an angle with the gasket axis such that after the mounting of the gasket in its working configuration, and thus subsequent to rotation of the lip around its articulation line, the angle formed by the end surface of the lip with the shaft axis, or the cutting angle, becomes substantially equal to 90°. It has been noticed, in fact, that with a gasket according to this invention, the main sealing lip develops the maximum scraping effect, with subsequent maximum sealing of the gasket, even after prolonged use of the damper, or wherever the gasket is fitted.

This is at least partly a result of the fact that when this end surface is inclined, as in the previous known configurations, the forces derived from fluid pressure exerted on that end surface are resolved into a first component perpendicular to that surface, and a second component parallel to that surface, and turned towards the shaft axis. The first component, the extension of which is outside the rotation line of the lip, involves a rotation stress on the lip in a direction opposite to the sealing edge and the shaft surface.

However, in gaskets according to this invention, the contrary is the case. That is, the said forces derived from the fluid pressure are now resolved so as to act on that end surface, which is now essentially parallel to the shaft axis, and the action line of which intersects the articulation line of the lip, or passes inside same.

In the latter case, that force thus now acts to rotate the lip towards the shaft surface, and to therefore increase the degree of sealing. According to another advantageous feature of the present invention, these gaskets, in which the still ring is mechanically stressed in a direction parallel to the shaft axis, and towards the front closing surface of the cylinder, are provided with at least two circular and concentric sealing lips for static sealing on that front closing surface, defining a hollow space between each other. In this way, a kind of labyrinth is obtained, which cooperates to considerably improve the degree of gasket sealing in this area, and to act as a warranty against blow-by due to possible scoring of the closing or front surface.

Moreover, since during fitting of the damper the gasket is initially positioned on the front closing surface of cylinder, after which the damper can be provided with a stiff ring stressing mechanical means, the possibility that the gasket may shift from its ideal theoretical position during such fitting is reduced, as compared to known solutions having only one sealing lip, since the fitting and holding surface between gaskets and closing surface is increased.

BRIEF DESCRIPTION OF THE DRAWING

The present invention may be more fully understood with respect to the following preferred embodiment, and to the drawings, in which:

FIG. 1 is a side, elevational, partially cross-sectional view of the gasket of the present invention in connection with a McPherson type damper;

FIG. 2 is a side, elevational, partially cross-sectional view of the gasket of the present invention in connection with a different damper of the McPherson type;

FIG. 3 is a side, elevational, cross-sectional view of a gasket in accordance with the present invention taken in a plane passing through the gasket axis thereof;

FIG. 4 is a diagramatical enlarged sectional view of a portion of the radial gasket of the present invention showing the static sealing lips in their minimum and maximum deflection states; and FIG. 5 is a partial, side, elevational, partially cross-sectional view showing the radial gasket of the present invention as shown in FIG. 2 in its working configuration.

DESCRIPTION OF PREFERRED EMBODIMENTS

Referring to the figures, in which like numbers refer to like portions thereof, FIGS. 1 and 2 show a damper, generally of a known type, which includes an external cylinder 10, a coaxial internal shaft 12 and a closing element 14 for the bottom of the cylinder, which is hermetically fitted with a gasket 16, and a thread 16' on the cylinder 10, (or which is welded, as at 16" in FIG. 2). Element 14 is capable of supporting an axial-stressing mechanical element 18, inside which shaft 12 can move axially in both directions, as shown by arrow X, with the possible insertion of an antifriction lining 19.

The closing surface 14 is provided with a radial gasket 20 of the present invention, which is designed to prevent any blow-by of fluid under pressure, and specifically oil under pressure as is present in cavity 22 of cylinder 10, both in correspondence with said surface 14 and in correspondence with the external surface of shaft 12.

In order to obtain these results, the gasket 20, which is more clearly shown in FIGS. 3 and 4, includes a stiff ring 24, which can, for instance, be made of metal, which carries a body made of a flexible sealing material, in particular a rubber-based material, generally indicated by 26. In FIGS. 3 and 4 the gasket is shown in cross-section along a plane passing through its axis, and the following description will refer to that section, with an indication of the points and lines of same to which lines and surfaces defined by the envelope of those points and lines around the gasket axis will obviously correspond. The gasket axis coincides with the axis of shaft 12 when the gasket is in its working position or configuration. First of all, and with reference to FIG. 3, the gasket essentially shows two lips, namely a main lip 28 and a secondary lip 30, the main lip 28 being on the side of the gasket which is subjected to pressure, while the secondary lip 30 provides a sealing action under conditions which are not subjected to such pressure.

In accordance with known techniques, the lips are manufactured in such a way as to undergo, at the moment of fitting up, a rotation or articulation around a point (in a cross-section) which may be approximately in the area indicated by A in FIG. 3, said articulation occurring under the radially outward thrust exerted during the fitting. Lips 28 and 30 inside surfaces 32 and 34, respectively, are turned towards the gasket axis, and are angularly positioned, with negative and positive angles, with respect to that axis. In this manner, in its working condition a hollow space 36 (FIG. 4) is formed, and assists in sealing due to the formation of a kind of labyrinth. The main lip 28 is defined in its upper part by a surface which is submitted to fluid pressure, and which forms an angle $\alpha$ with the gasket axis when in the inoperative condition shown in FIG. 3. In this case, this angle exceeds 60°. In any case, however, the angle $\alpha$ will have a value which will depend on the gasket material used and the lip articulation angle, said value being calculated in a manner such that, once the gasket is fitted up, surface 38 forms an angle $\alpha$ substantially equal to 90° with the shaft axis. In this way, the pressure exerted by oil on surface 38 gives rise to a resultant force R (FIG. 5), which is substantially parallel to the shaft axis, and which results in the advantageous features of better shaft sealing by creating a maximum scraping effect, and elimination of the possibility of fluid blow-by or raisers. (This fluid blow-by always occurs in conventional gaskets, where a wedge is obtained due to the geometry of the angle commonly called the cutting angle. This is the case where comparatively recent technology is used to obtain the gasket directly from molding).

Moreover, the resultant force R is substantially aligned with the articulation point of the lip, or even displaced towards the shaft axis with respect to that point. It therefore tends to push the lip 28 against the surface of shaft 12. This action is integrated by a resilient element 40, such as a spiral spring, housed under tension in a suitable seat 42 provided on the external side of lip 28. The gasket of the invention can also include two aligned and concentric sealing lips 44 and 46 in connection with the static sealing area on the cylinder closing surface 4. These sealing lips 44 and 46 form a hollow space 48 therebetween and at least one of these lips, in this instance lip 44, is substantially aligned with the direction Y of gasket compression caused by the component 18 on the metallic ring 24.

The presence of these two lips, 44 and 46, and their hollow space 48, creates a labyrinth, which ensures perfect sealing, even in this situation. Moreover, by increasing the supporting surface of the gasket on closing surface 14, another advantage is obtained, i.e., the gasket is held more securely in its theoretical fitting up position, since in this manner it is easier to prevent the gasket from taking radially offset positions with respect to its design before the closing and compression element 18 is applied, and during the fitting up of same. In this way, precise positioning of the gasket is ensured, and therefore a better guarantee is obtained that the gasket can operate under ideal conditions without subsequently undergoing out-of-balance wear, which would quickly make the gasket, and consequently the whole damper, unserviceable.

Furthermore, the double-sealing obtained by the two lips 44 and 46 guarantees against possible fluid blow-by, such as that due to scoring of the closing surface derived from manufacturing defects of same, and finally allows great fitting-up strokes to be absorbed (FIG. 4), permitting more economical mechanical configurations, with wider tolerances.

It must be noticed that the configuration described and illustrated may undergo modification and changes without departing from the spirit and scope of the present invention.

I claim:

1. A radial gasket for use in connection with a shaft adapted for axial movement within a cylinder containing a fluid under pressure therein and having a front face substantially perpendicular to said shaft and through which said shaft projects, said gasket adapted to be mounted in a working configuration at the intersection of said shaft with said front face of said cylinder, and comprising a rigid, annular support ring and a shaped body of flexible sealing material carried by said rigid support ring, said shaped body of flexible sealing material having a gasket axis parallel to the axis of said shaft and including a first surface for dynamic contact with said shaft and a second surface for static contact with said front face of said cylinder, said first surface of said shaped body of flexible sealing material including a protruding lip portion extending in a direction generally away from said front face of said cylinder so as to be subjected to said fluid under pressure within said cylinder, said protruding lip portion including an end face, said shaped body of flexible sealing material having a normal configuration prior to being mounted in said working configuration such that the angle between said end face of said protruding lip portion and said gasket axis is less than 90° and whereby upon being mounted in said working configuration said protruding lip portion of said shaped body of flexible sealing material is caused to rotate about an articulation line so that the angle between said end face of said protruding lip portion and said gasket axis becomes substantially equal to 90°.

2. The radial gasket of claim 1 wherein said shaped body of flexible sealing material has a normal configuration prior to being mounted in said working configuration such that the angle between said end face of said protruding lip portion and said gasket axis is at least about 60°.

3. The radial gasket of claim 1 wherein said protruding lip portion of said shaped body of flexible sealing material comprises a first protruding lip portion, and wherein said first surface includes a second protruding lip portion extending in a direction generally towards said front face of said cylinder.

4. The radial gasket of claim 3 wherein said second protruding lip portion of said shaped body of flexible sealing material has a normal configuration such that an angle is formed between said second protruding lip portion and said gasket axis whereby when said radial gasket is in said working configuration said first and second protruding lip portions are in contact with said shaft with a hollow space being formed therebetween.

5. A radial gasket of claim 1 wherein said rigid annular support ring is mechanically stressed in a direction parallel to the axis of said shaft and towards said front face of said cylinder.

6. The radial gasket of claim 5 wherein said second surface of said shaped body of flexible sealing material includes first and second adjacent annular raised surfaces adapated to contact said front face of said cylinder so as to form a hollow space therebetween.

7. The radial gasket of claim 6 wherein at least one of said pair of raised surfaces is in substantial alignment with the portion of said rigid annular support ring which is submitted to mechanical stress.

* * * * *